July 30, 1935.  B. D. BEDFORD  2,009,834
ELECTRIC VALVE CONVERTING APPARATUS
Filed Sept. 26, 1933
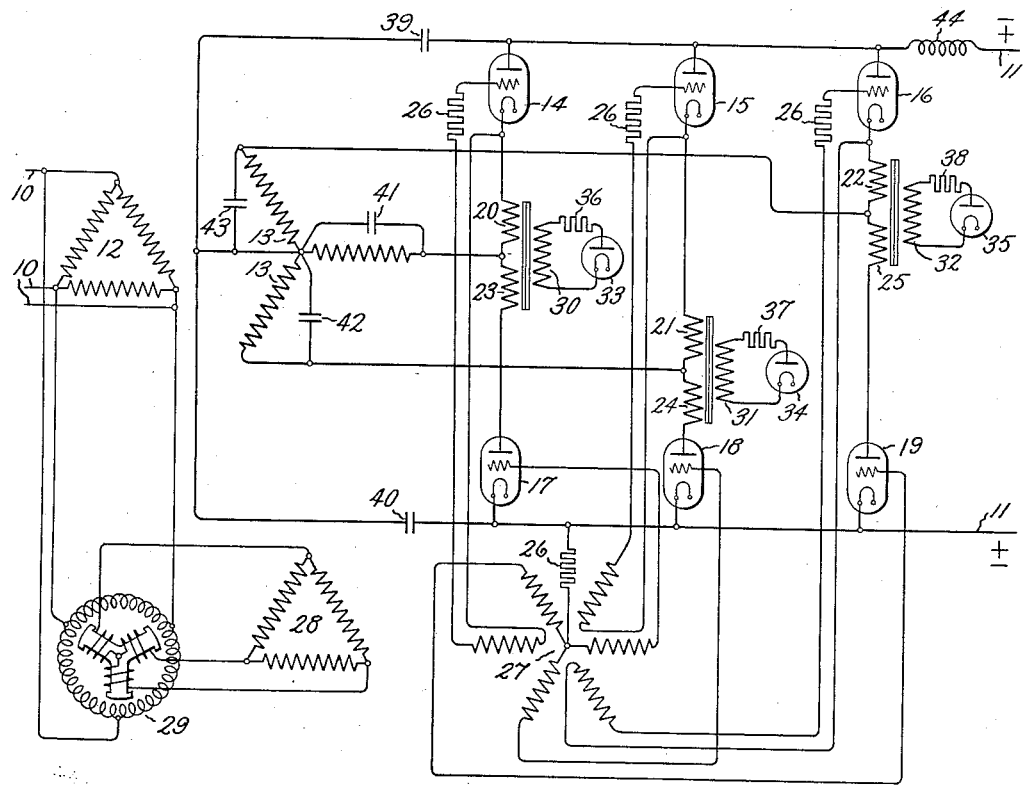
Inventor:
Burnice D. Bedford,
by Harry E. Dunham
His Attorney.

Patented July 30, 1935

2,009,834

UNITED STATES PATENT OFFICE 2,009,834

ELECTRIC VALVE CONVERTING APPARATUS

Burnice D. Bedford, Schenectady, N. Y., assignor to General Electric Company, a corporation of New York Application September 26, 1933, Serial No. 691,000

6 Claims. (Cl. 175—363)

My invention relates to electric valve converting apparatus and more particularly to such apparatus in which the load current is suddenly transferred between the several electric valves, giving rise to potential transients in various portions of the circuit.

In many type of electric valve converting apparatus heretofore devised, such for example, as grid controlled electric valve rectifiers and electric valve inverters, the current is suddenly transferred or commutated between the several electric valves of the apparatus. This sudden transfer of current, due to inductive reactance in various portions of the circuit, sets up potential transients of considerable magnitude which disadvantageously affect the operation of the apparatus. For example, in circuits of this type, the use of valves of the gaseous or vapor electric discharge type has found increasing favor because of the relatively large amounts of power which may be handled at ordinary operating voltages. In such circuits, it generally occurs that the electric valve from which current is transferred has impressed thereon a very high negative, or inverse, voltage upon the interruption of current therein. This high inverse voltage imposes a severe strain on the electric valve and may, in addition, shorten the life of the tube by severe positive ion bombardment. It has been found that the magnitude of these potential transients or inverse voltages may be diminished by retarding the rate at which current is transferred or commutated between the electric valves. The deleterious effect of these inverse voltages may also be decreased by decreasing the rate at which these potential transients build up; that is, decreasing the steepness of their wave front.

It is an object of my invention, therefore, to provide an improved electric valve converting apparatus which will overcome the above mentioned disadvantages of the arrangements of the prior art, and which will be simple and reliable in operation.

It is another object of my invention to provide an improved electric valve converting apparatus in which the transfer of the load current between the several valves of the apparatus is substantially retarded, and in which the steepness of the wave front of the potential transients set up in the circuit is substantially decreased.

In accordance with one embodiment of my invention, a plurality of electric valves are arranged to interconnect a supply circuit and a load circuit through a transformer network. Means are provided for rendering the valves alternately conductive and non-conductive in a predetermined sequence and there is provided also a source of commutating voltage, which may be either a voltage generated in the transformer network or a voltage produced by commutating capacitors, effective to periodically transfer the current between electric valves. An inductive winding is interposed in the connection between each electric valve and the transformer network and means are provided for substantially short circuiting the potentials induced in each of these windings by a decrease of current in its associated electric valve. This short circuiting may be effected by coupling a secondary winding with each inductive winding, short circuited through an auxiliary electric valve either with or without a current limiting resistance. In case the apparatus is connected to supply energy either to or from a direct current circuit and is connected for full wave operation, the inductive windings included in the connections to the positive and negative electric valves may be inductively coupled so that a single secondary winding will serve a pair of electric valves. In accordance with another feature of my invention certain points of the transformer network are connected to both sides of the direct current circuit through capacitors to limit the voltage fluctuations across various portions of the circuit.

For a better understanding of my invention, together with other and further objects thereof, reference is had to the following description taken in connection with the accompanying drawing and its scope will be pointed out in the appended claims. The single figure of the drawing diagrammatically illustrates my invention as applied to an apparatus for transmitting energy between a three phase alternating current circuit and a direct current circuit.

Referring now more particularly to the drawing, there is shown an electric valve converting apparatus for transmitting energy between a three-phase alternating current circuit 10 and a direct current circuit 11. This apparatus includes a three-phase transformer provided with a primary network 12 connected to the circuit 10 and with a three-phase star connected secondary network 13 connected to the upper side of of the direct current circuit 11 through electric valves 14, 15 and 16 and inductive windings 20, 21 and 22, respectively, and to the other side of the direct current circuit 11 through electric valves 17, 18 and 19 and inductive windings 23, 24 and 25, respectively. Electric valves 14–19 inclusive, are each provided with an anode, a cathode and a control electrode or grid and may be of any of the several types well known in the art although I prefer to use valves of the gaseous or vapor electric discharge type.

In order to render the several electric valves alternately conductive and non-conductive in a predetermined sequence, their control electrodes or grids are connected to their respective cathodes through current limiting resistors 26 and the proper phase windings of the secondary network 27 of a grid transformer, the primary network 28 of which may be energized from the alternating current circuit 10 through any suitable phase adjusting mechanism, such as a rotary phase shifting transformer 29. The grid transformer 27—28 is preferably self-saturating, or some other means is preferably provided to convert the alternating potential impressed upon the grids of the valves 14–19, inclusive, into one of peaked wave form. However, in case the alternating current circuit 10 is not connected to an independent source of electromotive force for determining its frequency and wave form, the primary winding 28 of the grid transformer may be energized from any suitable source of alternating current of a frequency at which it is desired to operate the alternating current circuit 10. In this case also, since the electromotive force of the network 13 will not be available to commutate the current between the several electric valves, commutating capacitors may be connected between the several electric valves in a well known manner.

In order to minimize the transients set up within the various portions of the circuit upon sudden transfer of current between the electric valves, and in order to retard this sudden transfer of current, the inductive windings 20–25, inclusive, are included in the connections of the electric valves 14–19, inclusive, respectively. Inductively coupled with the pairs of windings 20—23, 21—24, and 22—25, are the secondary windings 30, 31 and 32, respectively. These windings 30, 31 and 32 are closed through electric valves 33, 34 and 35 and resistors 36, 37 and 38, respectively. Resistors 36, 37 and 38 operate to dissipate the current flowing in the circuit through the electric valves 33, 34 and 35 thereby damping the circuit so that oscillatory currents will not tend to flow therein. If oscillatory currents were permitted to flow in this circuit they would probably introduce transients in the networks to which they are coupled. In order to additionally stabilize the circuit and decrease the rate at which transient voltages are built up in the several portions of the circuit, the electrical neutral of the network 13 is connected to the two sides of the direct current circuit 11 through the capacitors 39 and 40 and to the junctions between the pairs of reactors 20, 23, 21, 24 and 22, 25 through the capacitors 41, 42 and 43 respectively. If desired, a current smoothing reactor 44 may be included in the direct current circuit 11, as illustrated.

The operation of the above described apparatus to minimize the potential transients induced in various portions of the circuit and to decrease the steepness of their wave front will be considered, assuming that the apparatus is operating as a controlled rectifier transmitting energy from the three-phase supply circuit 10 to the direct current load circuit 11. It will be assumed also that the vertical components of the various phase windings of the network 13, as illustrated in the diagram, represent the instantaneous potentials of their terminals with respect to the neutral and that the phase rotation is clockwise. Under these assumptions, it will be seen that current will flow from the lower phase winding of the network 13, through electric valve 18, the direct current circuit, and electric valve 16 to the upper phase winding of the network 13. With no grid excitation on the electric valves 14–19, inclusive, or with the grids of the valves excited with alternating potentials in phase with their anode potentials, the current will be commutated by the electromotive force of the network 13 from electric valve 16 to the electric valve 14 some 30 electrical degrees later, at which time the instantaneous electromotive force of the upper phase winding of the network 13 equals that of the right-hand phase winding of that network.

In case the potentials of the several electric valves are retarded by means of the rotary phase shifting transformer 29 by an angle, of for example, 30 electrical degrees, the instantaneous electromotive force of the right-hand phase winding of the network 13 will have increased to a value considerably above that of the upper phase winding of the network 13 and this difference in the instantaneous potential of these two networks tends to produce a very sudden transfer of the current from the valve 16 to the valve 14, as is well understood by those skilled in the art. Such sudden transfer, or commutation of current, has a number of serious disadvantages. For example, the sudden increasing or decreasing of current in electric valves produces strains on the valves themselves, and may tend to produce arc backs due to the very heavy positive ion bombardment of the anode as the inverse voltage increases rapidly.

This sudden transfer or commutation of current may be retarded by the inclusion of the inductive reactance devices 20–25, inclusive, the impedance of which is effective to decrease the rate of transfer of current to a predetermined value. The inclusion of these reactances alone, however, tends to increase the magnitude of the inverse voltage applied to the electric valve from which current is commutated. For example, under the assumed conditions, when the grid of electric valve 14 is excited, the instantaneous difference of potential between the upper phase winding and the right-hand phase winding of the network 13 is consumed almost entirely across the inductive reactances 20 and 22, and, assuming them to be symmetrical, is evenly divided between them. Since the potential of the terminal of the upper phase winding of the network 13 is positive with respect to that of the right-hand phase winding, it will be seen that half of this commutating potential appears across the reactance 22. The current is decreasing in electric valve 16 associated with the reactance 22, which tends to maintain the current in the valve 16. Upon the interruption of current in this valve, the reactance voltage of the device 22 appears as an inverse voltage on electric valve 16. This rapid building up of the inverse voltage has the disadvantages noted above. However, with the addition of the winding 32 coupled to the winding 22, this winding being closed through a low resistance 38 and an auxiliary electric valve 35, or other unilaterally conductive device, the winding 22 becomes substantially short circuited so that its terminal voltage is reduced to a small, or negligible, value. However, if this current is building up in the inductive winding 20 and dying down in the inductive winding 22, the polarity of the potentials induced in these two windings will be opposite so that the electric valve 33 connected across the inductive winding 30, coupled to the inductive winding 20, will not conduct current or reduce the voltage of the inductive winding 20. In brief, substantially the entire commutating voltage is absorbed across the inductive winding 20 in series with the electric valve in which current is building up, thus aiding in the building up of the current, while the rise in the inverse voltage across the electric valve in which current is dying down, due to the sudden transfer of current, is greatly retarded.

While I have described my invention as applied to an arrangement for transmitting energy from a three-phase alternating current supply circuit to a direct current load circuit by means of a controlled rectifier, it will be apparent to those skilled in the art that it is equally applicable to such apparatus when operating as an inverter and transmitting energy in the opposite direction, that is, from the direct current circuit to the alternating current circuit, or between other supply and load circuits having similar operating characteristics.

While I have described what I at present consider the preferred embodiment of my invention, it will be obvious to those skilled in the art that various changes and modifications may be made without departing from my invention, and I, therefore, aim in the appended claims to cover all such changes and modifications as fall within the true spirit and scope of my invention.

What I claim as new and desire to secure by Letters Patent of the United States, is:—

1. An electric valve converting apparatus for transmitting energy between a supply circuit and a load circuit comprising a transformer network, a plurality of electric valves for interconnecting said circuits through said network, means for rendering said valves alternately conductive and nonconductive in a predetermined sequence, a source of commutating potential tending to rapidly transfer the load current of the apparatus between said valves, inductive winding connected in series with each of said valves, and means including a damped circuit for substantially short circuiting the potential induced in each of said windings by a decrease of current in its associated electric valve.

2. An electric valve converting apparatus for transmitting energy between a supply circuit and a load circuit comprising a transformer network, a plurality of electric valves for interconnecting said circuits through said network, means for rendering said valves alternately conductive and nonconductive in a predetermined sequence, a source of commutating potential tending to rapidly transfer the load current of the apparatus between said valves, an inductive winding connected in series with each of said valves, and an auxiliary electric valve connected in circuit with each of said inductive windings with such polarity as to substantially short circuit the potential induced in the winding by a decrease of current in its associated electric valve.

3. An electric valve converting apparatus for transmitting energy between a supply circuit and a load circuit comprising a transformer network, a plurality of electric valves for interconnecting said circuits through said network, means for rendering said valves alternately conductive and nonconductive in a predetermined sequence, a source of commutating potential tending to rapidly transfer the load current of the apparatus between said valves, an inductive winding connected in series with each of said valves, a secondary inductive winding coupled to each of said inductive windings, and a resistance element and an auxiliary electric valve serially connected across each of said secondary windings with such a polarity as to conduct current during the intervals when the current is decreasing in the corresponding main electric valve.

4. An electric valve converting apparatus for transmitting energy between direct and alternating current load circuits comprising a transformer network, a group of electric valves connected to the several terminals of said networks for connection to one side of said direct current circuit, a second group of electric valves oppositely connected to the several terminals of said network for connection to the other side of said direct current circuit, means for rendering said valves alternately conductive and nonconductive in a predetermined sequence, a source of commutating potential tending to rapidly transfer the load current of the apparatus between said valves, an inductive winding interposed in the connection of each electric valve to said network, and means including a damped circuit for substantially short circuiting the potential induced in each of said windings by a decrease of current in its associated electric valve.

5. An electric valve converting apparatus for transmitting energy between direct and alternating current load circuits comprising a transformer network, a group of electric valves connected to the several terminals of said network for connection to one side of said direct current circuit, a second group of electric valves oppositely connected to the several terminals of said network for connection to the other side of said direct current circuit, means for rendering said valves alternately conductive and non-conductive in a predetermined sequence, a source of commutating potential tending to rapidly transfer the load current of the apparatus between said valves, an inductive winding interposed in the connection of each electric valve to said network, a secondary winding inductively coupled to the windings interposed in the connections to each terminal of said network, and an auxiliary electric valve connected in circuit with each of said auxiliary windings with such polarity as to substantially short circuit the potential induced in either of the coupled inductive windings by a decrease of current in their associated electric valves.

6. An electric valve converting apparatus for transmitting energy between direct and alternating current load circuits comprising a transformer network provided with an electrical neutral, a group of electric valves connected to the several terminals of said network for connection to one side of said direct current circuit, a second group of electric valves oppositely connected to the several terminals of said network for connection to the other side of said network, capacitance means for interconnecting the neutral of said network with each side of said direct current circuit, additional capacitance means connected between said neutral and each terminal of said network, means for rendering said valves alternately conductive and nonconductive in a predetermined sequence, a source of commutating potential tending to rapidly transfer the load current of the apparatus between said valves, an inductive winding interposed in the connection of each electric valve to said network, a secondary winding inductively coupled to the windings interposed in the connections to each terminal of said network, and an auxiliary electric valve connected in circuit with each of said auxiliary windings with such polarity as to substantially short circuit the potential induced in either of the coupled inductive windings by a decrease of current in their associated electric valves.

BURNICE D. BEDFORD.